United States Patent [19]

Ito et al.

[11] 3,894,713

[45] July 15, 1975

[54] EXHAUST GAS CONTROL VALVE FOR USE WITH AN INTERNAL COMBUSTION ENGINE

[75] Inventors: Mikiji Ito, Nagoya; Motohisa Miura, Kariya; Toshiyuki Ito, Tokonabe, all of Japan

[73] Assignee: Nippondenso Co., Ltd., Kariya, Japan

[22] Filed: Sept. 25, 1973

[21] Appl. No.: 400,672

[30] Foreign Application Priority Data

Sept. 30, 1972 Japan.............................. 47-113914

[52] U.S. Cl. ............................................. 251/61.5
[51] Int. Cl............................................ F16k 31/165
[58] Field of Search ......................... 251/61–61.5, 251/330, 359; 123/119 A

[56] References Cited
UNITED STATES PATENTS

| | | | |
|---|---|---|---|
| 1,844,126 | 2/1932 | Kennedy | 251/359 X |
| 2,631,832 | 3/1953 | Hieger | 251/61 X |
| 2,934,307 | 4/1960 | Henderson | 251/330 X |
| 3,672,629 | 6/1972 | Sorteberg | 251/61.4 X |
| 3,774,583 | 11/1973 | King | 123/119 A |

*Primary Examiner*—Henry T. Klinksiek
*Attorney, Agent, or Firm*—Cushman, Darby & Cushman

[57] ABSTRACT

In an exhaust gas control valve for use with an internal combustion engine of the type in which a shaft having a valve disk fixed to one end thereof has its the other end securely fixed to a control diaphragm so that the displacement of the shaft and hence the opening and closing of the valve may be controlled in response to the operating condition of the internal combustion engine, the extension of the shaft beyond the valve disk is supported by a round bore of a spline-fitting-like valve seat body having a plurality of spline-like slots and fitted into one port of the control valve, the inner end of the valve seat body serving as a valve seat, whereby a bearing bush of the conventional exhaust gas control valve which supports the shaft at the midpoint portion thereof may be eliminated.

6 Claims, 4 Drawing Figures

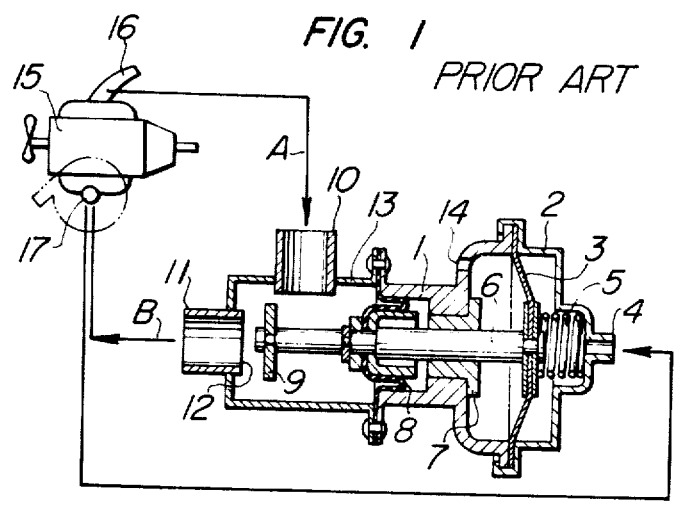
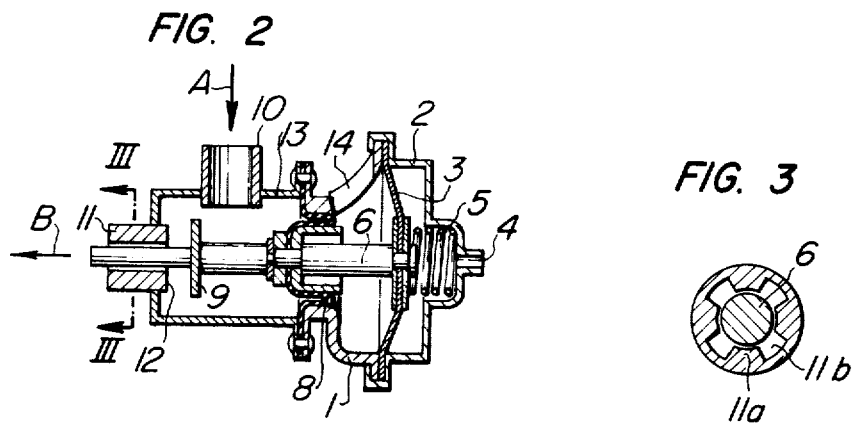
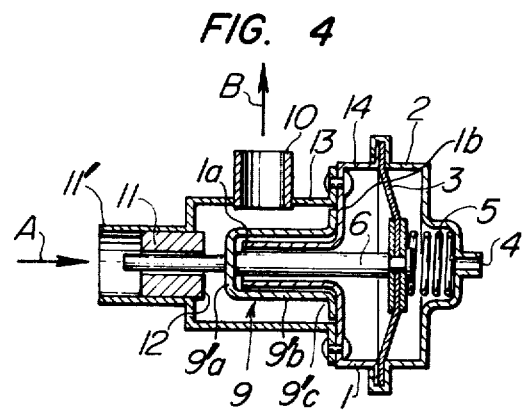

EXHAUST GAS CONTROL VALVE FOR USE WITH AN INTERNAL COMBUSTION ENGINE

BACKGROUND OF THE INVENTION

The present invention relates to an improvement of an exhaust gas control valve used for reducing the emission of NOx pollutants from an internal combustion engine of an automotive vehicle.

In the conventional exhaust gas control valves, a valve rod or shaft one end of which is fixed to a control diaphragm actuable in response to the operating condition of an internal combustion engine and the other end of which is fixed to a valve disk, is supported by a bearing bush made of generally brass. In order to attain a desired parallelism between the valve disk and its valve seat the valve rod or shaft and the bush have much smaller tolerances so that the valve shaft tends to stick to the bush because of soot, steam and other foreign materials contained in the exhaust gas when the bush is exposed thereto. Furthermore the axial length of the bearing bush is relatively long as compared with the outer diameter of the valve shaft so that the desired parallelism between the valve disk and the valve seat may be attained. As a result the overall dimensions of the exhaust gas control valve are limited by the axial length of the bush so that the conventional exhaust gas control valves are large in size. It is therefore difficult to mount the conventional exhaust gas control valve upon an automotive vehicle. Furthermore the conventional exhaust gas control valve has a second diaphragm for sealing the brass bush from the exhaust gas, but the second diaphragm which is generally made of rubber is subjected to the high temperature exhaust gas so that its service life is shorter, and if the second diaphragm is damaged the brass bush is directly exposed to the exhaust gas so that the valve rod sticks to the bush because of the reason described hereinbefore. The sticking of the valve rod is also caused by dust, mud and so on contained in the air so that the air vent formed through the housing of the control diaphragm has a very small diameter. As a result the control diaphragm and/or the second diaphragms cannot be cooled sufficiently so that their service life is also considerably reduced.

SUMMARY OF THE INVENTION

In view of the above, one of the objects of the present invention is to provide an improved exhaust gas control valve which may substantially eliminate the defects encountered in the conventional exhaust gas control valves.

According to one aspect of the present invention a valve rod or shaft is supported by a valve seat body having a valve seat formed at the inner end thereof and fitted into a valve port. The valve seat body is substantially similar in construction to a spline fitting having a plurality of slots so that the valve rod as well as the round bore portion of the valve seat body may have larger tolerances while a desired parallelism between the valve disk and the valve seat may be attained. Since the slots are provided the area of surface of contact between the valve rod and the bore may be considerably reduced so that the sticking of the valve rod to the bore may be positively prevented. Furthermore the brass bush used in the convontional exhaust gas control valve may be eliminated so that the exhaust gas control valves in accordance with the present invention are compact in size. Furthermore the large-sized air vents may be provided so that the cooling efficiency of the control and second diaphragms may be much improved with the result in increase of their service life.

According to another aspect of the present invention, even the second diaphragm may be eliminated so that the control valve in accordance with the present invention may be used with the exhaust gas of a higher temperature and an exhaust gas cooling device which is disposed in the upper stream of the conventional control valve may be eliminated. The cost of the antipollution devices for automotive vehicles may be therefore considerably reduced.

The above and other objects, features and advantages of the present invention will become more apparent from the following description of the preferred embodiments thereof taken into conjunction with the accompanying drawing.

BRIEF DESCRIPTION OF THE DRAWING

FIG. 1 is a sectional view of a conventional exhaust gas control valve,

FIG. 2 is a sectional view of a first embodiment of the present invention;

FIG. 3 is a sectional view taken along the line III—III of FIG. 2; and

FIG. 4 is a sectional view of a second embodiment of the present invention.

Same reference numerals are used to designate similar parts throughout figures.

DESCRIPTION OF THE PREFERRED EMBODIMENTS:

Prior Art, FIG. 1

Prior to the description of the preferred embodiments of the present invention, a prior art exhaust gas control valve will be briefly described in order to particularly and clearly point out the defects thereof which the present invention can eliminate. A diaphragm box consisting of a housing 1 and a cover 2 is divided into two chambers by a first diaphragm 3 loaded with a spring 5, and the negative pressure of an intake pipe of an engine 15 is transmitted through a pipe 4 fixed to the cover 2 to the chamber between the cover and the first diaphragm 3 whereas the chamber between the housing 1 and the first diaphragm 3 is communicated with the surrounding atmosphere through an air vent 14 formed through the housing 1. In response to the negative pressure transmitted from the intake pipe the first diaphragm 3 is caused to move to the right or left so that a valve shaft 6 fixed to the first diaphragm 3 is also caused to move to the right or left. The shaft 6 which is supported by a bearing bush 7 fitted into the housing 1 has a second diaphragm 8 secured to the midpoint of the shaft 6 and a valve disk 9 fixed to the free end of the shaft 6. The second diaphragm 8 whose periphery is airtightly held between the flanges of the housing 1 and a valve casing 13 serves to prevent the exhaust gas flowing through the valve casing 13 from directly making contact with the bush 7. The exhaust gas flows from an exhaust pipe 16 through a first pipe 10 into the valve casing 13 as indicated by the arrow A and is discharged through a second pipe 11 into the intake pipe 17 of the engine 15, but when the valve disk 9 is pressed against a valve seat 12 which is one end of the pipe 11 the discharge of the exhaust gas from the valve casing 13 into the intake pipe 17 is interrupted.

As described hereinbefore the second diaphragm 8 serves to prevent the bush 7 from being directly exposed to the exhaust gas passing through the valve casing 13 in order to prevent the sticking between the bushing 7 and the shaft 6. In the prior art exhaust gas control valve the bush 7 is spaced apart from the valve disk 9 and the valve seat 12 by a relatively greater distance so that the axial length of the bush 7 must be sufficiently long as compared with the outer diameter of the shaft 6 and the close fitting between the shaft 6 and the bush 7 must be provided so as to ensure a desired parallelism between the valve disk 9 and the valve seat 12. As a result the length between the intake pipe 10 and the cover 2 cannot be reduced sufficiently for mounting on an automotive vehicle because of the limited length of the bush 7. Even when the second diaphragm 8 is partly damaged the bush 7 is exposed to the exhaust gas so that the shaft 6 sticks to the bush 7. Furthermore sticking occurs because of the dust, mud and so on contained in the air so that the air vent 14 must be made small. As a result the first diaphragm 3 cannot be cooled sufficiently. Furthermore the degradation of the second diaphragm 8 is very rapid because the second diaphragm 8 which is generally made of rubber is directly exposed to the high temperature exhaust gas.

First Embodiment, FIGS. 2 and 3

Referring to FIGS. 2 and 3, a first embodiment of the present invention will be described hereinafter which may eliminates the defects of the prior art exhaust gas control valves described hereinbefore. The first embodiment is substantially similar in construction to the prior art control valve described with reference to FIG. 1 except the arrangements of the valve shaft 6 and the air vent 14.

A valve seat body 11 having a valve seat 12 formed at the inner end thereof is similar in construction to a spline fitting having four or six spline slots 11b which are used as the exhaust gas passages. The round bore portion 11a of the valve seat body 11 is used to support the shaft 6. In other words the valve seat body 11 serves not only as a bush but also as the second pipe 11 of the prior art control valve. The housing 1 which serves to support the first and second diaphragms 3 and 8 and the shaft 6 may comprises three or four bracket-like members assembled in such a way that the spacing between the adjacent members may serve as an air vent 14. Alternatively the housing 1 of unitary construction having the air vent 14 of a large diameter may be used. Since the shaft 6 is supported by the valve seat member 11 of the construction described above, the bush 7 of the prior art control valve may be eliminated and the bore of the valve seat body 11 and the shaft 6 may have larger tolerances. Furthermore the valve seat body 11 has spline slots 11b so that the area of contact surfaces between the bore and the shaft 6 may be considerably reduced. As a result the sticking of the shaft 6 may be prevented. The overall length of the exhaust gas control valve may be considerably reduced because of the elimination of the bush used in the conventional control valve so that the exhaust gas control valve may be made compact in size. Because of the elimination of the bush the air vent 14 may be increased in size or the large air vents 14 may be provided by the three or four bracket-like members of the housing 1 so that the first and second diaphragm 3 and 8 may be sufficiently cooled with the result of the increase in service life. The second diaphragm 8 only serves to seal the valve casing 13 so that even when it is damaged the sticking of the shaft can be prevented. The exhaust control valve of the present invention is very reliable in operation.

Second Embodiment, FIG. 4

Next the second embodiment of the present invention will be described with reference to FIG. 4. The second embodiment is substantially similar in construction to the first embodiment except that the second diaphragm 8 of the first embodiment is eliminated in order to solve the problem of the rapid degradation thereof due to the exposure to the high temperature exhaust gas.

A hollow cylindrical portion 1a is formed integrally with the housing 1 in such a way that the shaft may be fitted therein with a suitable clearance. A cupshaped shield member 9' which is closely fitted over the cylindrical portion 1a has its bottom 9'a securely fixed to the midpoint of the shaft 6. The bottom 9'a serves as a valve disk 9 of the first embodiment shown in FIG. 3. The cylindrical portion 9'b of the cup-shaped shield member 9' is closely fitted over the cylindrical portion 1a with a suitable clearance and has an outwardly extended flange or skirt 9'c which is pressed against the vertical wall 16 of the housing 1 as shown in FIG. 4 when the valve disk 9'a is moved away from the valve seat 12, thereby preventing the exhaust gas from flowing into the space between the cup-shaped shield member 9' and the cylindrical portion 1a and hence into the housing 1. In the second embodiment therefore the second diaphragm may be eliminated. The position and length of the cup-shaped shield member 9' are so selected that even when the valve disk 9'a is in contact with the valve seat 12 the cup-shaped shield member 9' may sufficiently overlap the cylindrical portion 1a.

In the second embodiment the valve seat body 11 is fitted into the second pipe 11', and the exhaust gas flows into the valve casing 13 through the second pipe 11' as indicated by the arrow A and is discharged through the first pipe 10 as indicated by the arrow B. When the valve disk portion 9'a is moved away from the valve seat 12, the flange or skirt 9'c of the cup-shaped shield member 9' is pressed against the vertical wall of the housing 1 so that the exhaust gas is prevented from flowing into the housing 1 and hence escaping into the surrounding atmosphere. When the valve disk 9'a is pressed against the valve seat 12, the flange or skirt 9'c is moved away from the vertical wall of the housing 1, but no exhaust gas is flowing into the valve casing 13 so that the leakage of the exhaust gas into the housing 1 may be prevented. The cup-shaped exhaust gas shield member 9' may be generally made of metal which may withstand a temperature higher than the first and second diaphragms made of rubber of the first embodiment. As a result the exhaust gas with a higher temperature may be used, and an exhaust gas cooling device which is generally disposed in the upper stream of the exhaust gas control valve may be eliminated.

As described hereinbefore according to the present invention the shaft 6 is supported by the valve seat body 11 having the valve seat 12 formed at the inner end thereof and having four or six spline-like slots 11b so that bush which is used in the prior art control valves and presents various problems may be eliminated. Therefore the exhaust gas control valve compact in size may be provided, and the first and second diaphragms 3 and 8 may be sufficiently cooled so that their service life may be considerably increased.

What is claimed is:

1. In an exhaust gas control valve for use with an internal combustion engine, said control valve comprising a valve casing having first and second ports, a valve disk for opening and closing said first port, said valve disk being fixed to a shaft extending into said casing through an open end of said casing axially opposite to said first port, sealing means provided between said shaft and said casing for air-tightly sealing said open end, and a control diaphragm disposed out of said casing and fixed to said shaft for controlling the opening and closing of said first port by said valve disk in response to the operating condition of the internal combustion engine, an improvement comprising a spline-fitting-like valve seat body fixed to said first port, said valve seat body having a round bore extending coaxially with said shaft and a plurality of spline-like slots radiating from said bore, the free end of said shaft extended beyond said valve disk fixed thereto being slidably fitted into said bore, and the inner end of said valve seat body forming a valve seat for said valve disk and said slots being the substantially exclusive means for passing exhaust gas through said valve seat body.

2. An exhaust gas control valve as defined in claim 1 wherein said sealing means comprises a diaphragm whose outer periphery is air-tightly fixed to said valve casing and whose center is air-tightly fixed to said shaft.

3. An exhaust gas control valve as defined in claim 2 wherein said first port is communicated with one of intake and exhaust pipes of the internal combustion engine and said second port, with the other pipe.

4. An exhaust gas control valve as defined in claim 1 wherein said sealing means comprises a stationary member comprising a hollow cylindrical portion into which said shaft is movably fitted with a suitable clearance and a radially outwardly extended flange portion formed integral with the rear end of said hollow cylindrical portion, the outer periphery of said flange portion being air-tightly secured to said valve casing; and a cup-shaped movable member comprising a disk-shaped bottom portion securely fixed to said shaft and serving as a valve disk for said first port and a hollow cylindrical portion coaxially fitted over said hollow cylindrical portion of the stationary member with a suitable clearance and having such an axial length that the cylindrical portions of said stationary and movable members remain overlapping each other even when said disk-shaped bottom portion is in contact with said valve seat.

5. An exhaust gas control valve as defined in claim 4 wherein said cup-shaped movable member has a flange portion radially outwardly flared from the open end of said cylindrical portion thereof.

6. An exhaust gas control valve as defined in claim 4 wherein said first port is communicated with an exhaust pipe of the internal combustion engine and said second port, with an intake pipe.

* * * * *